United States Patent [19]
Kitajima

[11] Patent Number: 5,739,921
[45] Date of Patent: Apr. 14, 1998

[54] COMMUNICATION SYSTEM WITH LINE-MASTER, MASTER-SLAVE DISCONNECTION DETECTION MEANS

[75] Inventor: Ikuo Kitajima, Tokyo, Japan

[73] Assignee: Matsushita Graphic Communication Systems Inc., Japan

[21] Appl. No.: 701,983

[22] Filed: Aug. 23, 1996

[30] Foreign Application Priority Data

Aug. 30, 1995 [JP] Japan .................................. 7-221363

[51] Int. Cl.$^6$ .................................................. H04N 1/32
[52] U.S. Cl. .......................... 358/442; 358/436; 358/440
[58] Field of Search .................... 358/434–440, 358/444, 442, 468; 379/57–58, 60–63, 100, 100.05, 100.06; 380/23, 25, 49; H04N 1/32

[56] References Cited

U.S. PATENT DOCUMENTS

| | | | |
|---|---|---|---|
| 5,530,745 | 6/1996 | Urasaka et al. | 379/58 |
| 5,638,185 | 6/1997 | Kato et al. | 358/434 |

*Primary Examiner*—Kim Vu
*Attorney, Agent, or Firm*—Parkhurst & Wendel

[57] ABSTRACT

A communication (comm) system is disclosed which comprises a master comm apparatus (app) coupled to a comm line and at least a slave comm app communicating with the master comm app and the comm line using wireless comm, the master comm app including: a detection portion for detecting a disconnection between the master comm app and the comm line and between the master comm app and the slave comm app and detecting a cause of the disconnection; a data generation portion responsive to the detection portion for generating logging data according to the disconnection and the cause; a memory for storing the logging data from the data generation portion; and a reading portion for reading the logging data from the memory in response to a request. The logging data is transmitted to the telephone line or a maintenance terminal wire-less communicated with the master comm app in response to a data transmission request. When one of slave comm app requests a forwarding, the slave comm app sends a forwarding request and data of a cause of disconnection caused by the forwarding and the master comm app generates first logging data including the data of cause of disconnection and after completion of the comm (fax) operation caused by the forwarding and generates second logging data in response to the disconnection from the telephone line.

11 Claims, 6 Drawing Sheets

FIG. 4

| LOGGING DATA LIST | | | | |
|---|---|---|---|---|
| DATE | TIME | KIND OF OPE | TERM | CAUSE |
| 1994, 05.20 | am10 : 34 | 11 | 1 | 02 |
| 1994, 05.20 | am10 : 41 | 10 | 0 | 50 |
| 1994, 05.21 | am 8 : 23 | 02 | 2 | 01 |
| 1994, 05.21 | am 8 : 23 | 02 | 2 | 50 |
| 1994, 05.22 | pm 2 : 30 | 01 | 1 | 20 |
| 1994, 05.23 | am11 : 50 | 27 | 0 | 61 |
| 1994, 05.23 | pm 7 : 50 | 20 | 0 | 60 |
| 30 | 31 | 32 | 33 | 34 |

FIG. 5

| COND DATA CODE | KIND OF OP |
|---|---|
| 01 | CALLED |
| 02 | CALLING |
| ⋮ | ⋮ |
| 10 | TEL LINE COMM |
| 11 | HOLDING TEL LINE |
| ⋮ | ⋮ |
| 13 | HOLDING TEL LINE FORWARDING |
| ⋮ | ⋮ |
| 20 | FAX AUTO TXSN |
| 21 | FAX MANUAL TXSN |
| ⋮ | ⋮ |
| 25 | FAX AUTO RECEIVING |
| 26 | FAX MANUAL RECEIVING |
| 27 | FAX REMOTE RECEIVING |
| ⋮ | ⋮ |

FIG. 6

| CODE | CAUSE OF DISCONNECTION AT WIRELESS COMM PORTION | CODE | CAUSE OF DISCONNECTION FROM TEL LINE |
|---|---|---|---|
| 01 | DISCONNECTION BY SLAVE COMM APP | 50 | COMPLETION OF COMM (ON HOOK) |
| 02 | HOLDING BY SLAVE COMM APP | 51 | COMPLETION OF TEL LINE COMM |
| 05 | SLAVE COMM APP BEYOND SERVICE AREA | 60 | COMPLETION OF FAX XMSN |
|  |  | 61 | COMPLETION OF FAX |
| 10 | RESPONSE BY OTER COMM APP TO A CALL |  |  |
| 11 | STOP OF RING SIG | 70 | FAX COMM ERROR |
| 20 | REMOTE FAX RECEIVING REQUEST | 80 | COMPLETION OF REC ICM |
| 30 | COMPLETION OF REMOTE CONT BY SLAVE COMM APP |  |  |

5,739,921

COMMUNICATION SYSTEM WITH LINE-MASTER, MASTER-SLAVE DISCONNECTION DETECTION MEANS

BACKGROUND OF THE INVENTION

1. Field of the Invention

This invention relates to a communication system, including a master communication apparatus communicating with a communication line and a slave communication apparatus communicating with the communication line through the master communication apparatus.

2. Description of the Prior Art

A communication system, including a master communication apparatus having a facsimile function for communicating with a telephone line and a slave communication apparatus communicating with the telephone line via the master communication apparatus through wireless communication is known.

SUMMARY OF THE INVENTION

The aim of the present invention is to provide an improved communication system.

According to this invention a first communication system is provided which comprises a master communication apparatus coupled to a communication line and at least a slave communication apparatus communicating with the master communication apparatus and the communication line using wireless communication, wherein the master communication apparatus comprises: a detection portion for detecting a disconnection between the master communication apparatus and the communication line and between the master communication apparatus and the slave communication apparatus and detecting a cause of the disconnection; a data generation portion responsive to the detection portion for generating logging data in accordance with the disconnection and the cause; a storing portion for storing the logging data from the data generation portion; and a reading portion for reading the logging data from the storing portion in response to a request.

According to this invention, a second communication system comprising: a master communication apparatus, coupled to a communication line; and at least a slave communication apparatus including: a communication portion for communicating with the master communication apparatus and the communication line using wireless communication; and a ringing portion for generating a ringing tone in response to the master communication apparatus; and an input portion for receiving a forwarding command, wherein the master communication apparatus comprises: a control portion for operating the ringing portion of at least the slave communication apparatus in response to a call from the communication line, for connecting the communication line in response to a response to the operation of the ringing portion from one of at least the slave communication apparatus, for receiving the forwarding command from one of at least the slave communication apparatus, for providing a first disconnection in response to the received forwarding command, for effecting a communication operation in accordance with the received forwarding command, for detecting a completion of the communication operation, and for providing a second disconnection from the communication line in response to the detected completion; a data generation portion responsive to the control portion for generating first logging data in response to the first disconnection and for generating second logging data in response to the second disconnection; a storing portion for storing the first and second logging data from the data generation portion; and a reading portion for reading the first and second logging data from the storing portion in response to a request.

According to this invention, a third communication system is provided which comprises: a master communication apparatus, coupled to a communication line; and at least a slave communication apparatus including: a communication portion for communicating with the master communication apparatus and the communication line using wireless communication; and a call signal sending portion for sending a call signal to the master communication apparatus in response to a call request; and a forwarding signal sending portion for generating and sending a forwarding command signal to the master communication apparatus in response to a forwarding request, wherein the master communication apparatus further comprises: a control portion for providing a connection with the communication line in response to the call request from one of at least the slave communication apparatus to provide a communication between the communication line and at least the slave communication apparatus, for receiving the forwarding signal from one of at least the slave communication apparatus, for providing a first disconnection in response to the received forwarding signal, for effecting a communication in accordance with the received forwarding command signal, for detecting a completion of the communication operation, and for providing a second disconnection from the communication line in response to the detected completion; a data generation portion responsive to the control portion for generating first logging data in response to the first disconnection and for generating a second logging data in response to the second disconnection; a storing portion for storing the first and second logging data from the data generation portion; and a reading portion for reading the first and second logging data from the storing portion in response to a request.

In the first to third communication systems, the master communication apparatus may further comprise a receiving portion for receiving a logging data request signal from the communication line and a sending portion for sending the logging data from the reading portion in response to the logging data request signal from the communication line.

In the first to third communication systems, at least the slave communication apparatus comprises a maintenance terminal including: a communication portion for communicating with the master communication apparatus using wireless communication; a data request portion for generating and sending data request signal to the master communication apparatus in response to a data request using the communication portion; a receiving portion for receiving the logging data from the master communication apparatus using the communication portion; and an outputting portion for outputting the logging data from the receiving portion, wherein the master communication apparatus may further comprise a second control portion for receiving the data request from the maintenance terminal, for operating the reading portion to read the logging data, and for sending the logging data from the reading portion to the maintenance terminal.

In the first to third communication systems, the master communication apparatus may further comprise a facsimile portion for effecting a facsimile communication with the communication line and the control portion effects the communication operation by operating the facsimile portion to receive a facsimile communication.

BRIEF DESCRIPTION OF THE DRAWINGS

The object and features of the present invention will become more readily apparent from the following detailed description taken in conjunction with the accompanying drawings in which:

FIG. 4 is an illustration of a logging data list of this embodiment;

FIG. 5 is a table of coded kinds of operations of this embodiment; and

FIG. 6 is a table of coded causes of disconnection of this embodiment.

The same or corresponding elements or parts are designated with like references throughout the drawings.

DETAILED DESCRIPTION OF THE INVENTION

Hereinbelow will be described an embodiment of this invention.

Figure 1:
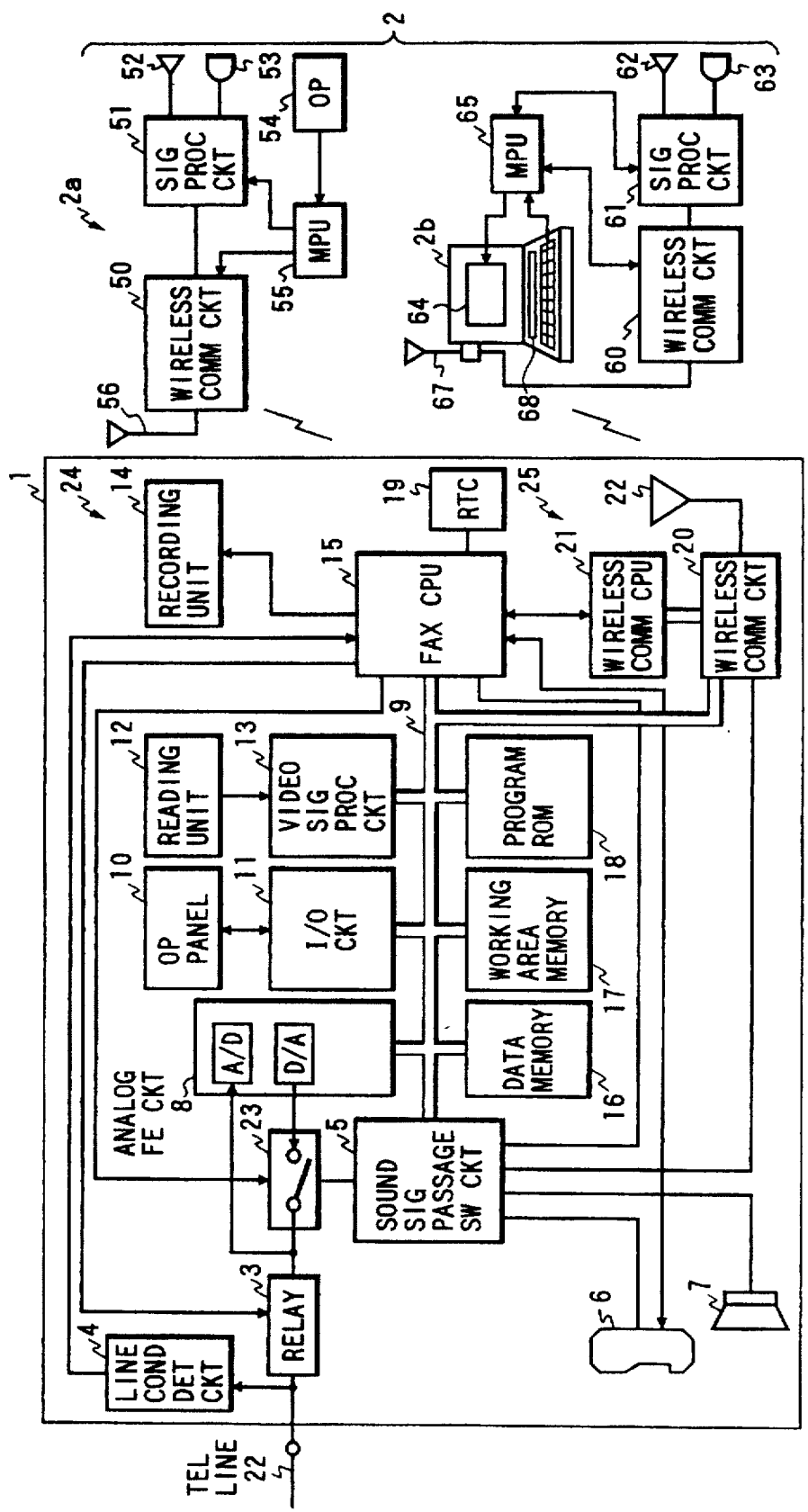
FIG. 1 is a block diagram of a communication apparatus of an embodiment of this invention.

FIG. 1 is a block diagram of a communication apparatus of this embodiment.

The communication system of the embodiment comprises a master communication apparatus 1, coupled to a telephone line (communication line) 22, for communicating with the telephone line 22, at least a slave communication apparatus 2 for communicating with the master communication apparatus and the communication line 22 using wireless communication. As one of the slave communication apparatus 2, a maintenance terminal 2b for communicating with the master communication apparatus is occasionally provided for a maintenance operation using wireless communication. Therefore, the maintenance terminal 2b is portable and is coupled to the master communication apparatus 1 only during a maintenance and is not coupled to the master communication apparatus 1 in the general communication but a slave communication apparatus 2a is coupled to the master communication apparatus 1. Moreover, a slave communication apparatus having a facsimile function may be coupled to the master communication apparatus 1.

A relay 3 connects the master communication apparatus 1 to the telephone line 22 or disconnects the master communication apparatus from the telephone line 22.

A line condition detection circuit 4 is connected to the telephone line 22 and detects a connection with an exchange (not shown), detects a ring signal, and generates a line condition signal and a ringing signal detection signal. A sound signal passage switching circuit 5 switchably forms one of sound signal passages under control of a facsimile central processing unit (cpu) 15. A wireless communication circuit 20 provides communication between the sound signal passage switching circuit 5 or the facsimile cpu 15 and the slave communication apparatus 2a or the maintenance terminal 2b through a wireless communication under control of a wireless communication cpu 21. The sound signal passage switching circuit 5 selectively forms one of sound signal passages between the sound signal passage switching circuit 5 and a hand set 6 for providing a sound communication with the telephone line 22, a speaker 7 for reproducing a sound signal and a ring signal from the telephone line, or the wireless communication circuit 20 under the control of the facsimile cpu 15.

An analog front end circuit 8 includes an a/d converter for a/d converting a signal from the communication line 22 and a d/a converter for d/a converting a digital signal from the facsimile cpu 15, and an AGC circuit (not shown) for automatically gain controlling and is communicated with the facsimile cpu 15 through a bus line 9. An operation panel 10, coupled to the facsimile cpu 15 through an I/O circuit 11 and the bus line 9, for generating a signal for dialing and operation signals in response to a manual operation by an operator and provides a necessary indication to the operator. A reading unit 12 is coupled to the facsimile cpu 15 through a video signal processing circuit 13 and the bus line 9 and effects a reading operation to generate video data from a read copy in cooperation with the video signal processing circuit 13. A recording unit 14 coupled to the facsimile cpu 15 records video data included in the facsimile signal from the communication line 22 or the video data from the reading unit 12. A real time clock circuit 19 generates and supplies a time signal indicative of the present date and present time to the facsimile cpu 15.

A data memory 16 stores video data to be transmitted and video data received, sound data for an out-going-message and incoming messages, and logging data. A working area memory 17 stores data generated due to the operation of the facsimile cpu 15. A program ROM 18 stores programs necessary for operations of the master communication apparatus 1. A wireless communication cpu 21 communicates with the facsimile cpu 15. The wireless communication cpu 21 controls the wireless communication circuit 20 to effect wireless communication through an antenna 22 with the slave communication apparatus, the maintenance terminal 2b, or other slave communication apparatus 2 to provide a sound communication and data communication under control of the facsimile cpu 15. The analog front end circuit 8, the reading unit 12, the recording unit 14, the data memory 16, the working area memory 17, the program ROM 18, and the facsimile cpu 15, etc. form a facsimile portion 24. The wireless communication circuit 20, the antenna 22, and the wireless communication cpu 21 form a wireless communication portion 25.

The slave communication apparatus 2a comprises an antenna 56, a wireless communication circuit 50, a signal processing circuit 51, a speaker 52, a microphone 53, an operation circuit 54 including a HOOK switch (not shown), and a microprocessing unit including a ROM storing programs and a RAM for storing data.

The maintenance terminal 2b comprises an antenna 67, a wireless communication circuit 60, a signal processing circuit 61, a speaker 62, a microphone 63, a keyboard circuit 66, a display 64, a printer 68, and a microprocessing unit 65 including a ROM storing programs and a RAM for storing data.

The maintenance terminal 2b effects a maintenance operation by occasionally or periodically coupled to the master communication apparatus 1 through a wireless communication. The maintenance terminal 2b requests the master communication apparatus 1 to transmit the stored logging data and receives the logging data, and the analyzes the logging data to provide an analysis of causes of communication errors to a service man through a display 64 or the printer 68.

Figure 2:
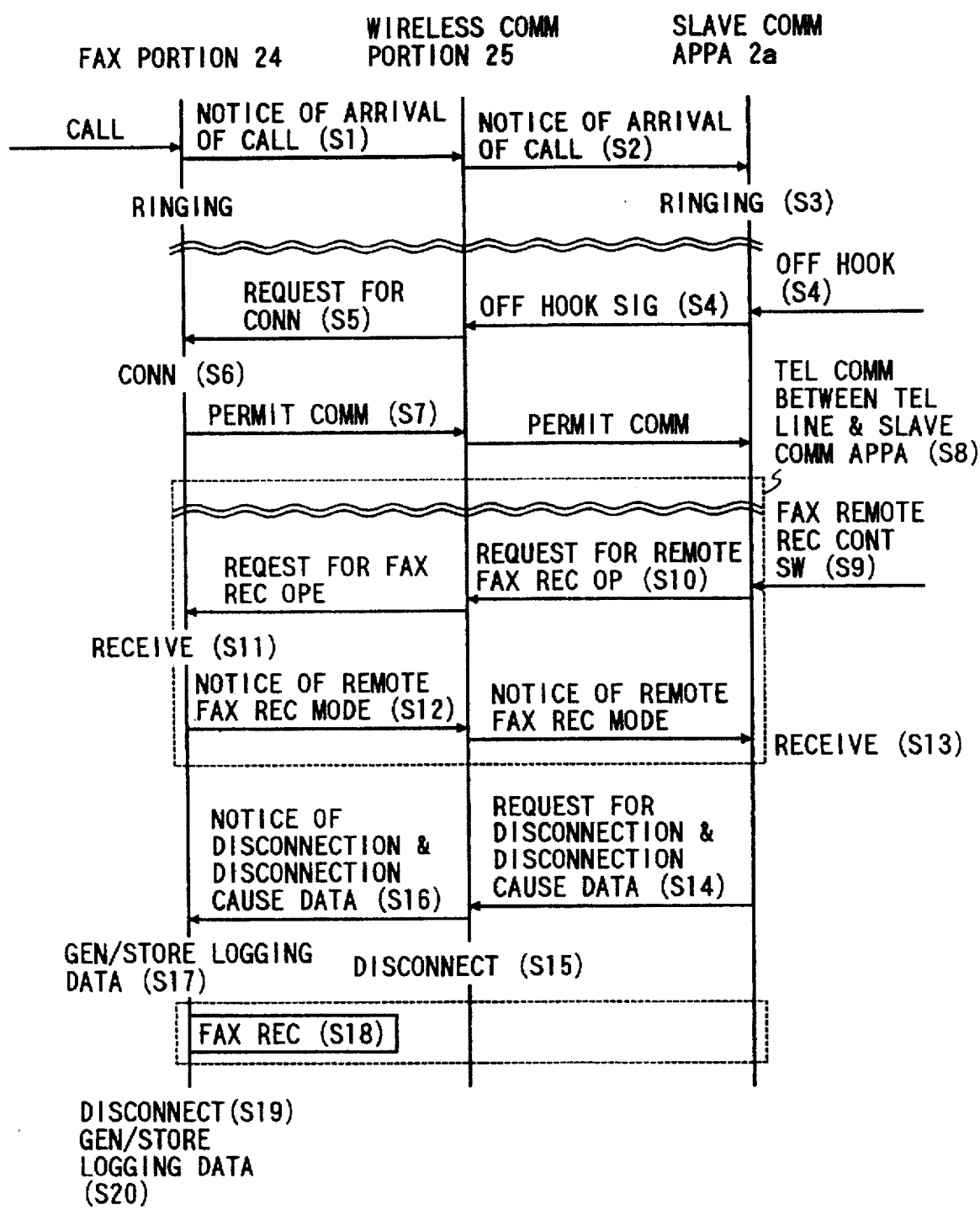
FIG. 2 is a diagram of a communication sequence for generating logging data of this embodiment.

FIG. 2 is a diagram of a communication sequence for generating the logging data of this embodiment in the case that the slave communication terminal 2a receives a call from the telephone line 22 and then, an operator sends a remote facsimile receiving request to the master communication apparatus 1, then, the master communication apparatus 1 effects a facsimile communication in response to the remote facsimile receiving request.

When a call arrives at the master communication apparatus 1 through the telephone line 22, a ring tone is generated by the speaker 7 in response to the ring signal detection signal from the line condition detection circuit 4 under control of the facsimile cpu 15. Then the master communication apparatus 1 transmits a notice of arrival of the call to all terminals 2 (slave communication apparatus 2a) connected through the wireless communication in step s1, and stores. The slave communication apparatus 2a receives the notice of arrival of call in step s2 and generates a ring tone in step s3 by the speaker 52. In response to this, one of the slave display terminals 2, for example, the slave display terminal 2a OFF-HOOKs and transmits an OFF HOOK signal to the wireless communication portion 25 in step s4. In response to the OFF HOOK signal, the wireless communication portion 25 sends a request for communication with the telephone line 22 to the facsimile cpu 15 in step s5. The facsimile portion 24 makes a connection to the telephone line 22 in step s6 and permits the slave communication apparatus 2a to communicate with the telephone line 22 in step s7. At the same time, the facsimile cpu 15 stores the conditional data indicative of permission of communication in the data memory 16. In response to the permission of communication, the slave communication apparatus 2a communicates with the caller via the wireless communication circuit 20, etc., and the telephone line 22 in step s8.

If a remote facsimile receiving switch provided to the operation circuit 54 of the slave communication apparatus 2a is depressed in step s9, a request for the remote facsimile receiving operation is sent to the fax portion 24 through the wireless communication portion 25 in step s10.

In response to the request for the remote facsimile receiving operation, the facsimile portion 24 enters a facsimile receiving mode in step s11, transmits a notice of the facsimile receiving mode to the slave communication apparatus 2a through the wireless communication portion 25, and stores the conditional data indicative of the remote facsimile receiving mode in step s12. In response to this, the slave communication apparatus 2a receives the notice of the remote facsimile receiving mode in step s13. The slave communication apparatus 2a generates and transmits a request for disconnection of wireless communication and generates and transmits data indicative of cause for the disconnection, i.e., disconnection cause data to the wireless communication portion 25 in step s14. In response to this, the wireless communication portion 25 disconnects the wireless communication with the slave communication apparatus 2a and sends a notice of disconnection of wireless communication from the slave communication apparatus 2a to the facsimile portion 24 in step s15. Then, the wireless communication portion 25 generates notice of disconnection and sends data indicative of a cause of the disconnection of the wireless communication from the slave communication apparatus 2a to the facsimile portion 24 in step s16. The facsimile portion 24 generates and stores logging data including the disconnection cause data with reference to the conditional data in the data memory 16 in step s17. In the following step s18, the facsimile portion 24 receives the facsimile signal, prints out the received image or stores video data from the facsimile signal, and stores conditional data of the facsimile receiving in step s18. When the remote facsimile receiving operation has been completed, the facsimile portion 24 makes a disconnection from the telephone line 22 in step s19 and generates logging data including the disconnection cause data with reference to the conditional data and stores it in the data memory 16 in step s20. As mentioned, in response to every disconnection from the telephone line 22 and disconnection in the wireless communication portion 24, logging data including the disconnection cause data is generated with reference to the conditional data and stored in the data memory 16.

Figure 3:
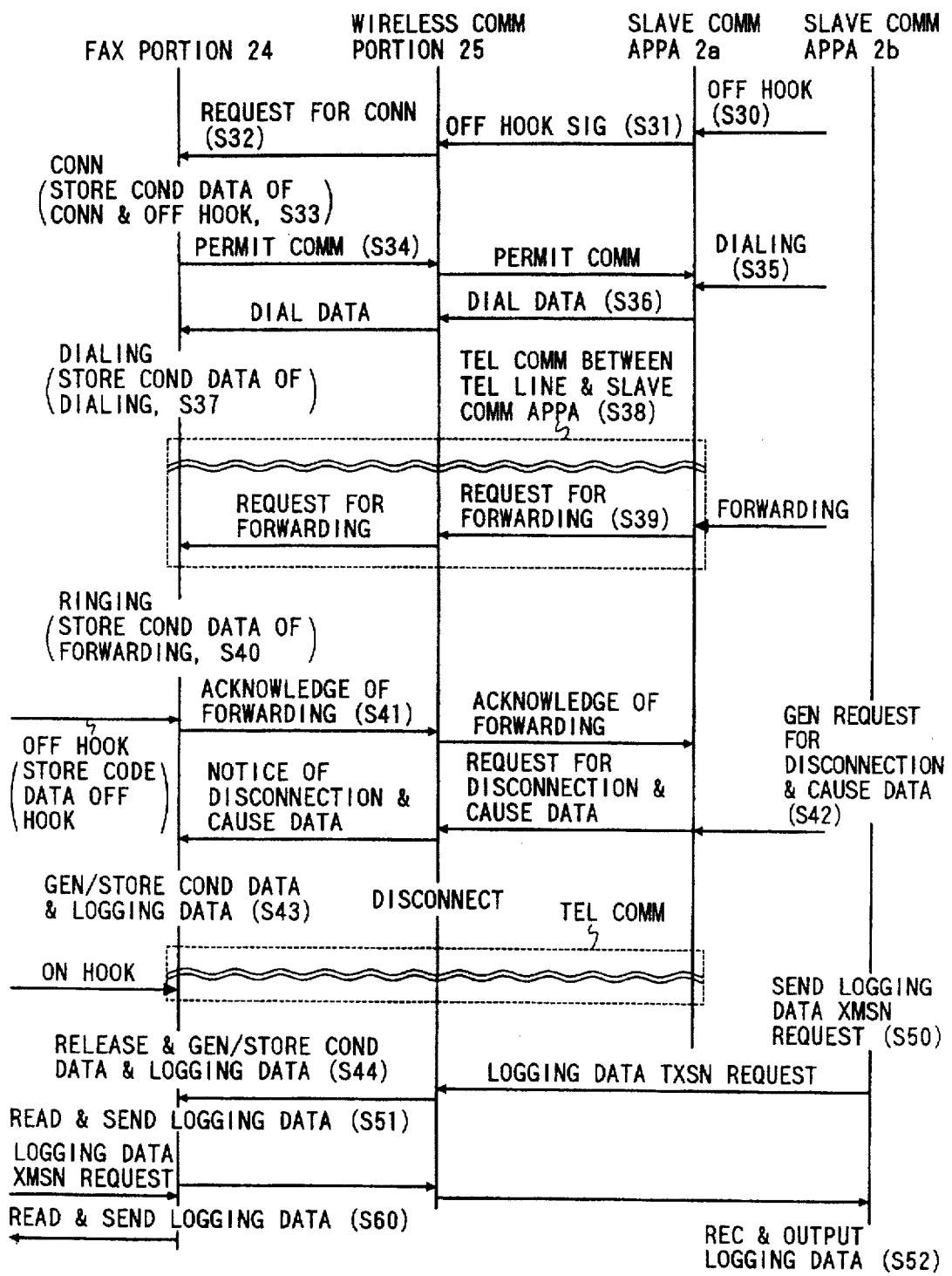
FIG. 3 is a diagram of a communication sequence for generating logging data of this embodiment.

FIG. 3 is a diagram of a communication sequence for generating the logging data of this embodiment when the slave communication terminal 2a makes a call to the telephone line 22 and then, the master communication apparatus 1 effects a telephone communication.

When one of slave communication apparatus 2, for example, the slave communication apparatus 2a, makes OFF HOOK in step s30 and transmits an OFF HOOK signal to the wireless communication portion 25 in step s31, the wireless communication portion 25 sends a request for connection with the telephone line 22 to the facsimile portion 24 instep s32. In response to this, the facsimile portion 24 makes a connection with the telephone line 22 using the relay 3 in step s33 and generates and stores conditional data of connection and OFF HOOK in data memory 16. Then, the facsimile portion 24 transmits a permission of communication to the slave communication apparatus 2a through the wireless communication control portion 24 and store the conditional data indicative of the permission in step s34. In response to this, the slave communication apparatus 1 receives a dialing operation in step s35 and transmits dial data to the facsimile portion 24 through the wireless communication portion 25 in step s36. In response to this, the facsimile portion 24 generates a dialing signal and transmits the dialing signal to the exchange through the telephone line 22 using the analog front end circuit 8 and stores conditional data of dialing in step s37.

When the calling from the slave communication apparatus 2a is received by the called party, the facsimile portion 24 forms a communication passage between the telephone line 22 and the slave communication apparatus 2a through the wireless communication portion 25 and stores conditional data of telephone line communication 22 in the data memory 16 and then, the operator of the slave communication apparatus 2a can communicate with the called party in s38.

On the completion of the communication, the operator of the slave communication apparatus 2a effects a forwarding operation to the slave communication apparatus 2a. In response to this, the slave communication apparatus 2a transmits a request for forwarding to the facsimile portion 24 through the wireless communication portion 25 in step s39. In response to this, the facsimile portion 24 generates the ring tone by the speaker 7 and stores conditional data of forwarding in step s40.

Then, the facsimile portion 24 operates the sound signal passage switching circuit 5 to couple the handset 6 to the telephone line 22, that is, OFF HOOK of the handset 6 and stores the conditional data indicative of OFF HOOK. In step s41, the facsimile portion 24 sends an acknowledge of the forwarding to the slave communication apparatus through the wireless communication control portion 25 and store the conditional data indicative of the acknowledge of forwarding. In response to this, the slave communication apparatus 2a generates a request for disconnection of wireless communication and disconnection cause data caused by the completion of forwarding to the wireless communication portion 25. In response to this, the wireless communication portion 25 makes a disconnection of the wireless communication with the slave communication apparatus 2a and sends a notice of disconnection and the disconnection cause data to the facsimile portion 24. The facsimile portion 25 generates conditional data of disconnection and the logging data including the disconnection cause data, the conditional data, time data from the real time clock circuit 19 and stores it in the data memory 16 in step s43. On the completion of the communication by the handset 6, the facsimile portion 24 makes ON HOOK, that is, the sound passage to the handset 6 is disconnected by the sound signal passage circuit 5 under the control of the facsimile cpu 15 and the facsimile cpu 15 controls the relay 3 to release the telephone line 22. In response to this disconnection, the facsimile control portion 24 generates the logging data and stores it in the data memory 16. As mentioned, the facsimile portion generates the logging data in accordance with causes of disconnection from the telephone line and disconnection in the wireless communication portion 25 with reference to the conditional data and stores it in the data memory 16 in step s44.

The facsimile cpu 15 receives a logging data transmission request from the maintenance 2b through the wireless communication portion 25 in step s50. In response to this, the facsimile cpu 15 reads the logging data from the data memory 16 and transmits the logging data to the maintenance terminal 2b in step s51. Moreover, the facsimile cpu 15 receives the logging data transmission request from the telephone line 22 through the analog front end circuit 8. On receiving the logging data transmission request from the telephone line 22, the facsimile cpu 15 reads the logging data from the data memory 16 and transmits the logging data to the telephone line 22 in step s60.

FIG. 4 is an illustration of a logging data list of this embodiment.

The logging data includes data of date and time of the disconnection, a kind of the operation accompanied with the disconnection, and data of the cause of the disconnection. The facsimile cpu 15 obtains the data of date and the time in response to the disconnection from the telephone line 22 or the disconnection at the wireless communication portion 25 from the real time clock circuit 19. Moreover, the facsimile cpu 15 detects the kind of the operation when the disconnection occurs. That is, the facsimile cpu 15 generates conditional data every operation in response to the ring signal, ON HOOK in the master communication apparatus 1, OFF HOOK in the master communication apparatus 1, a facsimile signal from the telephone line 22, ON HOOK in the slave communication apparatus 2a or 2b, OFF HOOK in the slave communication apparatus 2a or 2b, the forwarding request, or the remote facsimile receiving request from the slave communication apparatus 2a and other operations by the operators of the master communication apparatus 1 and the slave communication apparatus 2a. When a disconnection occurs, the facsimile cpu 15 determines the kind of operation when the disconnection occurs and stores data of kind of operation in the data memory 16 as shown in FIG. 4. The kinds of operations include the telecommunication with the called party, a data transmission for maintenance, the arrival of call, an extension communication, the facsimile receiving, the facsimile transmitting, the remote facsimile receiving, the forwarding, or the other operations generally provided to the facsimile system. In FIG. 4, data "0" at the column 33 of the terminal data represents the master communication terminal 1, data "1" represents the slave display terminal 2a, and data "2" represents another slave display terminal 2.

FIG. 5 is a table of coded kinds of operations of this embodiment. Data of cause, i.e., disconnection cause data are codes representing causes for the disconnection from the telephone line 22 and the disconnection at the wireless communication portion 25. There are coded causes, such as, the disconnection by the slave communication terminal 2, a response by other communication apparatus of this communication system in response to a call, a stop of arrived ring signal, a completion of a communication (ON HOOK), a completion of facsimile receiving (a detection of the DCN signal indicative of a line disconnection command), etc. This logging data is printed out using the recording unit 14 and transmitted to the maintenance terminal 2b or to the telephone line 22 in response to the request.

FIG. 6 is a table of coded causes of disconnection of this embodiment. The causes of disconnection from the telephone line 22 and the causes of disconnection at the wireless communication portion 25 are codes as shown in FIG. 6 and one of coded causes of disconnection is included in each of logging data as shown in FIG. 4.

In the embodiment mentioned above, the slave communication apparatus 2 may further comprises a facsimile unit for receiving and sending a video image through the wireless communication portion 25.

As mentioned, in the communication apparatus of this embodiment, the logging data is generated and stored every disconnection from the telephone line 22 or every disconnection at the wireless communication portion 25 such that the logging data includes the data of cause of the disconnection and the data of kind of operation executed on occurrence of the disconnection in addition to the date and time data. Therefore, the analysis of errors accompanied by the disconnections can be readily provided and a maintenance operation can be smoothly provided with the analysis. The logging data is obtained through the telephone line 22 or the maintenance slave terminal 2b, that is, the logging data can be remotely provided and provided at the site of the communication system, so that the maintenance is more surely provided.

As mentioned, the communication system of this embodiment comprises the master communication apparatus 1 coupled to a communication line 22 and at least a slave communication apparatus 2a communicating with the master communication apparatus 1 and the communication line 22 using the wireless communication portion 25. The facsimile cpu 15 of the master communication apparatus 1 detects a disconnection between the master communication apparatus 1 and the communication line in step s19 or s44 and between the master communication apparatus and the slave communication apparatus 2a in step s16 or s43 and detects a cause of the disconnection in step s19, s44, s16, or s43, in response to this, the facsimile cpu 15 generates the logging data in accordance with the disconnection and the cause, stores the logging data in step s17, s20, s43, or s44 from the conditional data and the disconnection cause data, and reads the logging data from the data memory 16 in response to a logging data transmission request in step s51 or s60.

What is claimed is:

1. A communication system: comprising a master communication apparatus coupled to a communication line and at least a slave communication apparatus communicating with said master communication apparatus and said communication line using wireless communication, wherein said master communication apparatus comprises:

detection means for detecting a disconnection between said master communication apparatus and said communication line and between said master communication apparatus and said slave communication apparatus and detecting a cause of said disconnection;

data generation means responsive to said detection means for generating logging data in accordance with said disconnection and said cause;

storing means for storing said logging data from said data generation means; and reading means for reading said logging data from said storing means in response to a request.

2. A communication system as claimed in claim 1, wherein said master communication apparatus further comprises receiving means for receiving a logging data request signal from said communication line and sending means for sending said logging data from said reading means in response to said logging data request signal from said communication line.

3. A communication system as claimed in claim 1, wherein at least said slave communication apparatus comprises a maintenance terminal including:

communication means for communicating with said master communication apparatus using wireless communication;

data request means for generating and sending data request signal to said master communication apparatus in response to a data request using said communication means;

receiving means for receiving said said logging data from said master communication apparatus using said communication means; and outputting means for outputting said logging data from said receiving means, wherein said master communication apparatus further comprises second control means for receiving said data request from said maintenance terminal, for operating said reading means to read said logging data, and for sending said logging data from said reading means to said maintenance terminal.

4. A communication system comprising:

a master communication apparatus, coupled to a communication line; and at least a slave communication apparatus including:
communication means for communicating with said master communication apparatus and said communication line using wireless communication; and
ringing means for generating a ringing tone in response to said master communication apparatus; and
input means for receiving a forwarding command, wherein said master communication apparatus comprises:
control means for operating said ringing means of at least said slave communication apparatus in response to a call from said communication line, for connecting said communication line in response to a response to the operation of said ringing means from one of at least said slave communication apparatus, for receiving said forwarding command from one of at least said slave communication apparatus, for providing a first disconnection in response to the received forwarding command, for effecting a communication operation in accordance with the received forwarding command, for detecting a completion of said communication operation, and for providing a second disconnection from said communication line in response to the detected completion;
data generation means responsive to said control means for generating first logging data in response to said first disconnection and for generating a second logging data in response to said second disconnection;
storing means for storing said first and second logging data from said data generation means; and reading means for reading said first and second logging data from said storing means in response to a request.

5. A communication system as claimed in claim 4, wherein said master communication apparatus further comprises
facsimile means for effecting a facsimile communication with said communication line and said control means effects said communication operation by operating said facsimile means to receive a facsimile communication.

6. A communication system as claimed in claim 4, wherein said master communication apparatus further comprises receiving means for receiving a logging data request signal from said communication line and sending means for sending said first and second logging data from said reading means in response to said received logging data request signal.

7. A communication system as claimed in claim 4, wherein at least said slave communication apparatus comprises a maintenance terminal including:

communication means for communicating with said master communication apparatus using wireless communication;

data request means for generating and sending data request signal to said master communication apparatus in response to a data request using said communication means;

receiving means for receiving said first data and said second logging data from said master communication apparatus; and outputting means for outputting said first and second logging data from said receiving means, wherein said master communication apparatus further comprises second control means for receiving said data request from said maintenance terminal, for operating said reading means to read said first and second logging data, and for sending said first and second logging data from said reading means to said maintenance terminal.

8. A communication system comprising:

a master communication apparatus, coupled to a communication line; and at least a slave communication apparatus including:
communication means for communicating with said master communication apparatus and said communication line using wireless communication; and
call signal sending means for sending a call signal to said master communication apparatus in response to a call request; and
forwarding signal sending means for generating and sending a forwarding command signal to said master communication apparatus in response to a forwarding request, wherein said master communication apparatus further comprises:
control means for providing a connection with said communication line in response to said call request from one of at least said slave communication apparatus to provide a communication between said communication line and at least said slave communication apparatus, for receiving said forwarding signal from one of at least said slave communication apparatus, for providing a first disconnection in response to the received forwarding signal, for effecting a communication in accordance with the received forwarding command signal, for detecting a completion of said communication operation, and for providing a second disconnection from said communication line in response to the detected completion;

data generation means responsive to said control means for generating first logging data in response to said first disconnection and for generating a second logging data in response to said second disconnection;

storing means for storing said first and second logging data from said data generation means; and reading means for reading said first and second logging data from said storing means in response to a request.

9. A communication system as claimed in claim 8, wherein said master communication apparatus further comprises facsimile means for effecting a facsimile communication with said communication line and said control means; effects said communication operation by operating said facsimile means to receive a facsimile communication.

10. A communication system as claimed in claim 8, wherein said master communication apparatus further comprises receiving means for receiving a logging data request signal from said communication line and sending means for sending said first and second logging data from said reading means in response to said logging data request signal.

11. A communication system as claimed in claim 8, wherein at least said slave communication apparatus comprises a maintenance terminal including:

communication means for communicating with said master communication apparatus using wireless communication;

data request means for generating and sending data request signal to said master communication apparatus in response to a data request;

receiving means for receiving said first data and said second logging data from said master communication apparatus; and outputting means for outputting said first and second logging data from said receiving means, wherein said master communication apparatus further comprises second control means for receiving said data request signal from said maintenance terminal, for operating said reading means to read said first and second logging data and sending said first and second logging data from said reading means to said maintenance terminal in response to the received data request signal.

* * * * *